US010445345B2

United States Patent
Pan et al.

(10) Patent No.: US 10,445,345 B2
(45) Date of Patent: Oct. 15, 2019

(54) METHOD, APPARATUS, AND SYSTEM FOR IDENTIFYING DATA TABLES

(71) Applicant: Alibaba Group Holding Limited, Grand Cayman (KY)

(72) Inventors: Min Pan, Hangzhou (CN); Ning Xu, Hangzhou (CN); Wei Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 170 days.

(21) Appl. No.: 15/623,231

(22) Filed: Jun. 14, 2017

(65) Prior Publication Data

US 2017/0364582 A1  Dec. 21, 2017

(30) Foreign Application Priority Data

Jun. 17, 2016  (CN) .......................... 2016 1 0440032

(51) Int. Cl.
| | | |
|---|---|---|
| G06F 17/30 | (2006.01) | |
| G06F 16/28 | (2019.01) | |
| G06F 16/22 | (2019.01) | |
| G06F 7/08 | (2006.01) | |

(52) U.S. Cl.
CPC .............. *G06F 16/288* (2019.01); *G06F 7/08* (2013.01); *G06F 16/2282* (2019.01)

(58) Field of Classification Search
CPC .................................................. G06F 16/00
See application file for complete search history.

(56) References Cited

U.S. PATENT DOCUMENTS

| | | | |
|---|---|---|---|
| 6,339,777 B1 * | 1/2002 | Attaluri ................. | G06F 16/284 |
| | | | 707/999.202 |
| 6,567,798 B1 | 5/2003 | Hollberg et al. | |
| 7,536,401 B2 | 5/2009 | Bitonti et al. | |
| 8,752,059 B2 | 6/2014 | Doyle et al. | |
| 8,862,632 B2 | 10/2014 | Ziemann et al. | |
| 9,244,954 B2 | 1/2016 | Ziemann et al. | |
| 9,311,046 B1 | 4/2016 | Hicks | |
| 9,483,245 B2 | 11/2016 | Ksayag et al. | |
| 9,576,072 B2 | 2/2017 | Gu et al. | |
| 2002/0128998 A1 | 9/2002 | Kil et al. | |

(Continued)

OTHER PUBLICATIONS

International Search Report and Written Opinion to corresponding International Application No. PCT/US17/37629 dated Aug. 31, 2017 (8 pages).

*Primary Examiner* — Khanh B Pham
(74) *Attorney, Agent, or Firm* — James J. DeCarlo; Greenberg Traurig, LLP

(57) ABSTRACT

Embodiments of the disclosure provide a method, apparatus, and system for identifying data tables. The method comprises acquiring a first dependency relationship between a plurality of data tables; collecting statistics on a path length and a path number of the data tables based on the first dependency relationship; acquiring a second dependency relationship between one or more fields in the data tables; determining importance coefficients of the one or more fields based on the second dependency relationship; determining a degree of association between the data tables by using the path length, the path number, and the importance coefficients; and identifying the data tables based on the degree of association.

18 Claims, 13 Drawing Sheets

(56) References Cited

U.S. PATENT DOCUMENTS

| | | |
|---|---|---|
| 2007/0179984 A1 | 8/2007 | Watanabe |
| 2008/0300851 A1 | 12/2008 | Chakrabarti et al. |
| 2009/0182710 A1 | 7/2009 | Short et al. |
| 2009/0193050 A1 | 7/2009 | Olson |
| 2010/0161651 A1* | 6/2010 | Cras ................ G06F 16/24544 707/769 |
| 2010/0228731 A1 | 9/2010 | Gollapudi |
| 2011/0051165 A1 | 3/2011 | Yamada et al. |
| 2012/0197908 A1 | 2/2012 | Unno |
| 2014/0172850 A1* | 6/2014 | Borkar ................ G06F 16/288 707/736 |
| 2014/0241356 A1 | 8/2014 | Zhang et al. |
| 2015/0169707 A1* | 6/2015 | Buda ................ G06F 16/284 707/603 |
| 2016/0085682 A1 | 3/2016 | Johnson et al. |
| 2017/0103107 A1* | 4/2017 | Kakwani ........... G06F 16/24553 |
| 2017/0116168 A1 | 4/2017 | Breslav |

\* cited by examiner

METHOD, APPARATUS, AND SYSTEM FOR IDENTIFYING DATA TABLES

CROSS-REFERENCE TO RELATED APPLICATIONS

This application claims the benefit of priority of Chinese Application No. 201610440032.2, titled "Method, Apparatus and System for Data Table Identification," filed on Jun. 17, 2016, which is hereby incorporated by reference in its entirety.

BACKGROUND

Technical Field

The following disclosure relates to the field of information technology, and in particular, to methods, systems, and apparatuses for identifying data tables and determining a degree of association between data tables.

Description of the Related Art

Industry has identified the "3V" characteristics for big data, namely: volume, velocity, and variety. Due to increased attention in recent years, storage and computing power of big data hardware and software has achieved acceptable results in many scenarios, but, the variety of big data is still the most pressing issue in big data applications.

In order to meet the requirements of varied big data, one solution is data exchange. In general, data exchange may be carried out between different companies or between different business departments in the same company. The specific form of data exchange is mutual access between different data tables in a data warehouse or cloud computing environment. In the process of daily business and in order to meet the requirements of various services for varied big data, the composition of one resulting data table may need to depend on data tables of multiple business departments and even data tables opened by different companies. However, in data exchange and mutual access, different data tables may have different importance levels for the resulting data table meeting the service requirements. The identification of data tables having high importance to be given priority in operation and maintenance then becomes an important task in the big data era. Since the identification of the importance of data tables is mainly determined through a degree of association of the data tables, determining the degree of association of data provided by departments and companies with the resulting data table meeting the service requirements is key to measuring the value of data exchange in mutual access of data.

Usually, the storage of data tables is implemented via a data warehouse. A data warehouse often stores thousands of data tables, and each data table contains dozens—or hundreds—of fields. In some scenarios, to meet analysis requirements, dependency relationships between multiple data tables are represented by a complex directed graph, as shown in FIG. 1.

FIG. 1 illustrates a schematic diagram of a directed acyclic graph having data tables A, B, C, D, and E as nodes. In FIG. 1, a circle represents a data table, and a letter in the circle represents the name of the data table, for example, data table A, data table B, etc. Letters in an annotation box beside the circle represent field names in the data table, for example, data table A contains fields a1, a2, a3, and a4. A directed line segment between two circles represents that two data tables have a mapping/dependency relationship, for example, the arrow from data table A to data table C represents that data table A contributes two fields (a1 and a2), to the data table C. That is, generation of data table C depends on fields a1 and a2 of data table A.

In the prior art, a degree of association between two data tables is calculated in two cases: in one case, two data tables have a direct dependency relationship (e.g., data table A and data table C in FIG. 1) and in the other case two data tables have an indirect dependency relationship (e.g., data table A and data table E in FIG. 1).

For data tables having a direct dependency relationship (e.g., data tables A and C in FIG. 1), a degree of association is calculated using current techniques according to a proportion of contributed fields. For example, in FIG. 1, when calculating a degree of association between data table A and data table C, first, it is determined that the data tables on which data table C depends include data table A and data table B, where data table A contributes two fields (a1, a2) to data table C, while data table B contributes only one field (b1) to data table C. Thus, the ratio between degrees of association of data table A and data table B with data table C is 2:1. That is, the degree of association of data table A with data table C is 2/3, while the degree of association of the data table B with the data table C is 1/3.

For data tables not having a direct dependency relationship (e.g., data tables A and E in FIG. 1), current techniques calculate a degree of association by converting the indirect dependency relationship into data links having a direct relationship through an intermediate data table. For example, for a degree of association of data table A with data table E in FIG. 1, a degree of association of data table A with data table C and a degree of association of data table C with data table E need to be calculated first. Since the degree of association of data table A with data table C is 2/3 (as discussed previously), and the degree of association of data table C with data table E is 1/4 (calculated using the process discussed previously), the degree of association of the data table A with the data table E is 2/3*1/4=1/6.

However, the degree of association between data tables calculated according to the above-mentioned current techniques can only be accurate to the granularity of data tables and cannot be specifically accurate to the granularity of fields of a data table. In practice, there are great differences in importance between different data fields in one data table, and current techniques cannot reflect such differences.

Secondly, for parent and child tables having a direct dependency relationship, a proportion of fields contributed by one child table to a parent table is simply taken as the degree of association in current techniques. However, this factor is too simplistic, and differences in actual implementations cannot be completely and precisely reflected.

Thirdly, a degree of association between parent and child tables having only an indirect dependency relationship is converted into a product of degrees of association between data tables having a direct dependency in calculation in current techniques, causing the degree of association between data tables separated by one or two layers to decrease exponentially; the degree of association attenuates too rapidly, and the real contribution between the data tables cannot be reflected. Therefore, the result of identifying the importance of data tables according to the prior art is not accurate.

BRIEF SUMMARY

In view of the aforementioned problems, embodiments of the disclosure are introduced to provide a method for identifying data tables, a method for determining a degree of association between data tables, an apparatus for identifying data tables, an apparatus for determining a degree of association between data tables, and a corresponding system for identifying data tables so as to overcome or at least in part solve the above-mentioned problems.

In one embodiment, a method is disclosed comprising acquiring a first dependency relationship between a plurality of data tables; collecting statistics on a path length and a path number of the data tables based on the first dependency relationship; acquiring a second dependency relationship between one or more fields in the data tables; determining importance coefficients of the one or more fields based on the second dependency relationship; determining a degree of association between the data tables by using the path length, the path number, and the importance coefficients; and identifying the data tables based on the degree of association.

In another embodiment, an apparatus is disclosed comprising a processor and a non-transitory memory storing computer-executable instructions therein that, when executed by the processor, cause the apparatus to perform a method of acquiring a first dependency relationship between a plurality of data tables; collecting statistics on a path length and a path number of the data tables based on the first dependency relationship; acquiring a second dependency relationship between one or more fields in the data tables; determining importance coefficients of the one or more fields based on the second dependency relationship; determining a degree of association between the data tables by using the path length, the path number, and the importance coefficients; and identifying the data tables based on the degree of association.

Compared with current techniques, the embodiments of the disclosure have the following advantages.

In the illustrated embodiments, after statistics are collected on a path length and a path number of data tables based on a first dependency relationship and importance coefficients of one or more fields are determined based on a second dependency relationship, a degree of association between the data tables is determined by using the path length, the path number, and the importance coefficients. The data tables are then identified based on the degree of association, so that a degree of association between data tables is determined at the granularity of fields in dimensions such as the usage of the fields, attributes of the fields themselves, the distance between the data tables, and the connectivity between the data tables. Thus the degree of association between the data tables can be measured scientifically and reasonably.

Secondly, in the illustrated embodiments, a connection coefficient and a distance coefficient between data tables are presented based on graph theory to serve as two important weight factors in measuring a degree of association between data tables, and a hierarchical relationship between data tables is introduced, and the hierarchical relationship between two tables is integrated into the distance coefficient to reasonably solve the problem of a degree of association between non-directly dependent data tables, so that the problem that the degree of association between non-directly dependent data tables attenuates too rapidly with the change of the hierarchy is avoided.

DETAILED DESCRIPTION

To make the objectives, features, and advantages of the disclosure easy to understand, the disclosure is described below in detail in conjunction with the accompanying figures and the related description of the embodiments.

Figure 2:
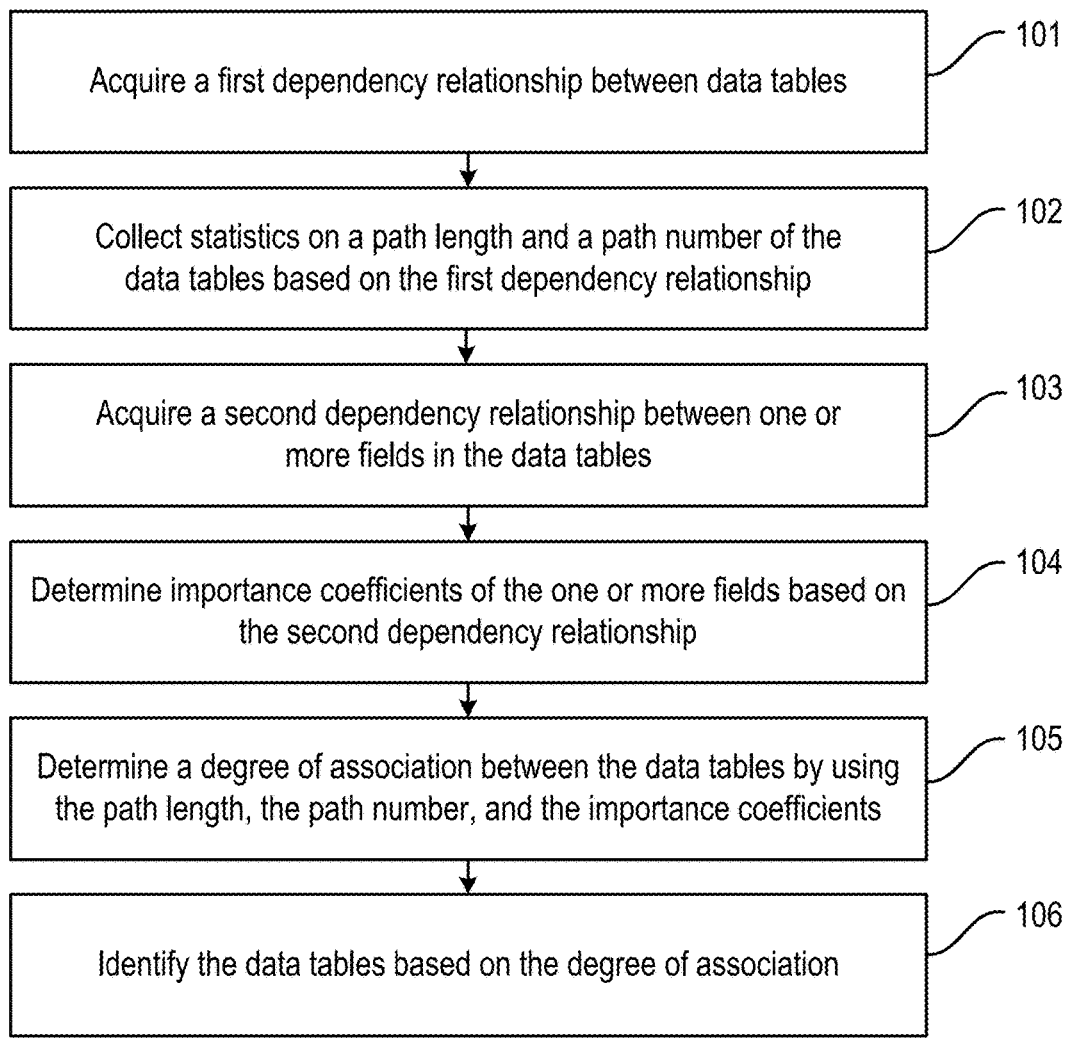
FIG. 2 is a flow diagram illustrating a method for identifying data tables according to some embodiments of the disclosure.

FIG. 2 is a flow diagram illustrating a method for identifying data tables according to some embodiments of the disclosure.

In one embodiment, a data table refers to a row-oriented table stored within a relational database. Alternatively, or in conjunction with the foregoing, a data table refers to a non-relational data storage paradigm such as a collection in a document-oriented database, a graph in a graph-based database, alternative table-based data arrangements such as column-based data tables, or any other storage mechanism designed to store relationships between items within a database or similar storage mechanism. In some embodiments, heterogeneous types of data tables may be utilized simultaneously in the disclosed embodiments (e.g., a dependency may be calculated between a row-based data table and a document-oriented collection).

Step 101: acquire a first dependency relationship between data tables.

In a big data environment, data exists in a data warehouse or database in the form of data tables. A data table is a logical concept, and it can be considered that data in a data table meets certain logical rules or logical conditions.

In one embodiment, a first dependency relationship may be a dependency relationship or mapping relationship between data tables. The dependency relationship or mapping relationship refers to the fact that the generation of a certain data table depends on one or more other data tables. For example, the first dependency relationship may be determined by acquiring mutual access data between all data tables in the data warehouse, with the data being in the form of a 2-tuple <C:c, A:a>. What this means is that a data table C has a mapping relationship with a data table A, and a field c of data table C is generated by a field a of data table A.

Figure 1:
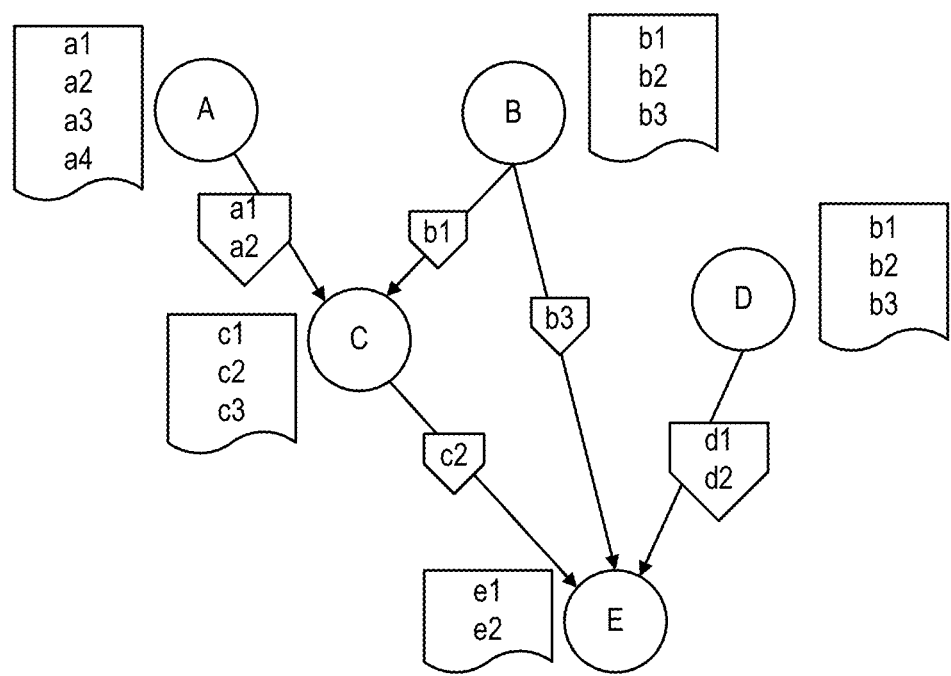
FIG. 1 illustrates a schematic diagram of a directed acyclic graph having data tables as nodes.

As shown in FIG. 1, the generation of data table C depends on data table A and data table B, that is, it can be considered that data table C has a corresponding dependency relationship or mapping relationship with data table A and data table B.

Step 102: collect statistics on a path length and a path number of the data tables based on the first dependency relationship.

A path length refers to the length of a distance between two data tables having a dependency relationship. For data tables having a direct dependency relationship, their path length may be generally considered as one, while for data tables having an indirect dependency, their path length may be determined through the number of data tables having an indirect dependency relationship between the two data tables. Usually, data tables having an indirect dependency relationship may not only have one path length, that is, data tables have multiple paths, and therefore, there may be more than one path number.

In one embodiment, the step of collecting statistics on a path length and a path number of data tables based on the first dependency relationship may specifically include the following sub steps.

Substep 1021: construct a directed acyclic graph of the data tables based on the first dependency relationship.

Substep 1022: collect statistics on a path length and a path number in the directed acyclic graph.

If each edge in one graph has a direction, the graph may be referred to as a directed graph. An edge in a directed graph is an ordered pair consisting of two vertexes. An ordered pair is usually represented by angle brackets, for example, $<v_i, v_j>$ represents one directed edge, where $v_i$ is the start point of the edge and $v_j$ is the end point of the edge. The edges $<v_i, v_j>$ and $<v_j, v_i>$ represent two different directed edges. In graph theory, if one directed graph starts from a certain vertex but fails to return to the vertex after passing through a number of edges, the graph is a directed acyclic graph.

In one embodiment, after a first dependency relationship between data tables is obtained, a directed acyclic graph having data tables as nodes may be constructed based on the first dependency relationship, and a path length and a path number of the two data tables can be obtained by collecting statistics on a path length and a path number in the directed acyclic graph. For example, in FIG. 1, there is only one path between data table A and data table E, that is, the path number is one (1), and the path length of the path is two (2). Data can be represented in the form of: <A-C-E>. It represents that there is one path, namely, A→C→E, between data table A and data table E.

Step 103: acquire a second dependency relationship between one or more fields in the data tables. Usually, one data table may include one or more fields, and since the generation of the data table may depend on the other one or more data tables, the generation of one field in the data table may also depend on one or more fields in the other one or more data tables.

Figure 3:
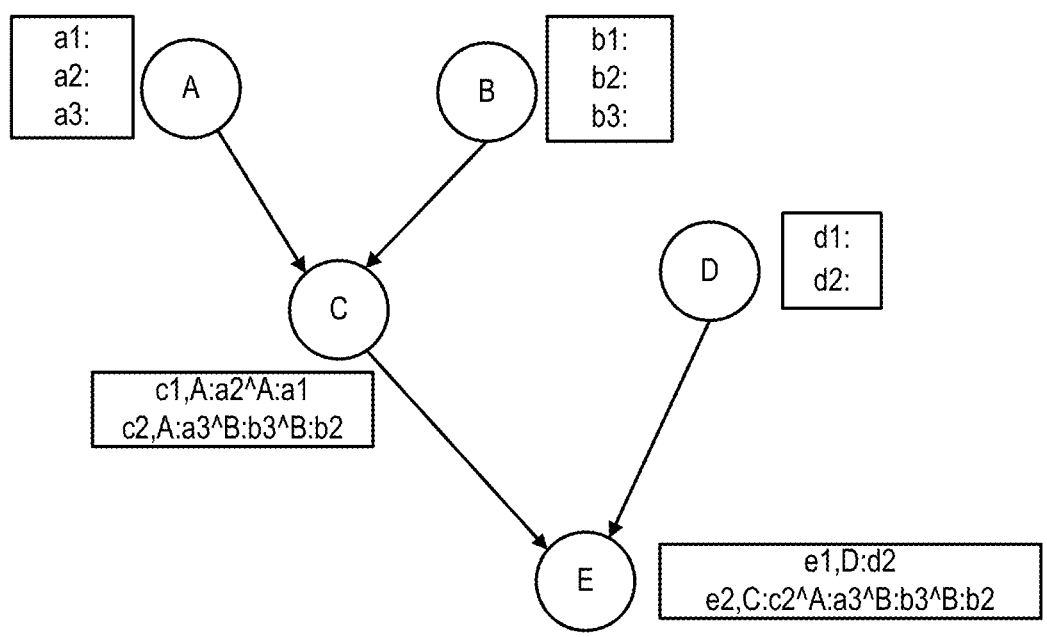
FIG. 3 is a diagram of a directed acyclic graph marked with field dependency relationships according to some embodiments of the disclosure

FIG. 3 is a diagram of a directed acyclic graph marked with field dependency relationships according to some embodiments of the disclosure. Specifically, a field dependency relationship may be represented by a data form of <C:c1, A:a1^A:a2>, meaning that the field c1 in the data table C is generated by the fields a1 and a2 in the data table A.

Secondly, the second dependency relationship may further include the number of times a field is used in a preset time period, namely, the number of times the field is accessed by downstream data tables, as well as the number of directly downstream tables of the data table, and the corresponding data form is <A:a1, 3, 2>, indicating that the field a1 of the data table A is accessed three times by downstream data tables in a preset time period, and the data table A has two directly downstream data tables. Usually, the preset time period may be one day. Certainly, the preset time period may also be set to two days or half a day according to needs in practice, therefore it is not specifically defined in the disclosure.

Step 104: determine importance coefficients of the one or more fields based on the second dependency relationship.

Usually, any one field in a data table has a corresponding field level, and different fields have different field levels. For example, there may be four field levels, 1, 2, 3, and 4, respectively corresponding to data in four states of being disclosable, sharable, private information, and top secret. The data form thereof may be <A:a1,1>, indicating that the field level of the field a1 in the data table A is of level 1, that is, the field a1 is disclosable.

In one embodiment, the step of determining importance coefficients of the one or more fields based on the second dependency relationship may specifically include the following substeps.

Substep 1041: acquire use frequencies of the one or more fields in a preset time period.

Substep 1042: determine importance coefficients of the one or more fields according to the use frequencies and/or field levels.

In one embodiment, the importance coefficients of the one or more fields may be in positive correlation with the use frequencies and/or the field levels.

In one embodiment, the importance coefficients of the one or more fields may be determined by using the equation $$\text{weight}(a_i) = \alpha \cdot \text{level\_weight}(a_i) + \beta \cdot \frac{\text{use\_cnt}(a_i)}{\sum_{i=1}^{n} \text{use\_cnt}(a_i)},$$

where level_weight($a_i$) is a field level of a field $a_i$, use_cnt ($a_i$) is a use frequency of the field $a_i$ in a preset time period, n is the number of fields in the data table, α and β are proportional coefficients, and 0<α, β<1.

Step 105: determine a degree of association between the data tables by using the path length, the path number, and the importance coefficients.

In one embodiment, the path length and the path number represent the strength in the degree of association between data tables. For example, the shorter the path length is, the stronger the degree of association is; the smaller the path number is, the more indispensable one data table is to the other data table.

Therefore, after the importance coefficients of the one or more fields in the data tables are determined and obtained, the degree of association between the data tables may be further determined by using the path length, the path number, and the importance coefficients.

Step 106: identify the data tables based on the degree of association.

In one embodiment, after degrees of association between the data tables are determined and obtained, the data tables may be identified based on the degrees of association. Specifically, multiple data tables required by a data service may be identified according to the degrees of association. For example, L data tables may be used for a certain data service; then, after degrees of association between the L data tables are separately determined and obtained, top K data tables having high degrees of association in the L data tables may be further screened out, and then the top K data tables are given priority in operation and maintenance and guarantee, so as to ensure the data quality and output time of the data tables.

In one embodiment, after statistics are collected on a path length and a path number of data tables based on a first dependency relationship and importance coefficients of one or more fields are determined based on a second dependency relationship, a degree of association between the data tables is determined by using the path length, the path number, and the importance coefficients, and the data tables are identified based on the degree of association, so that a degree of association between data tables is determined at the granularity of fields in dimensions such as the usage of the fields, attributes of the fields themselves, the distance between the data tables, and the connectivity between the data tables, and thus the degree of association between the data tables can be measured scientifically and reasonably.

Figure 4:
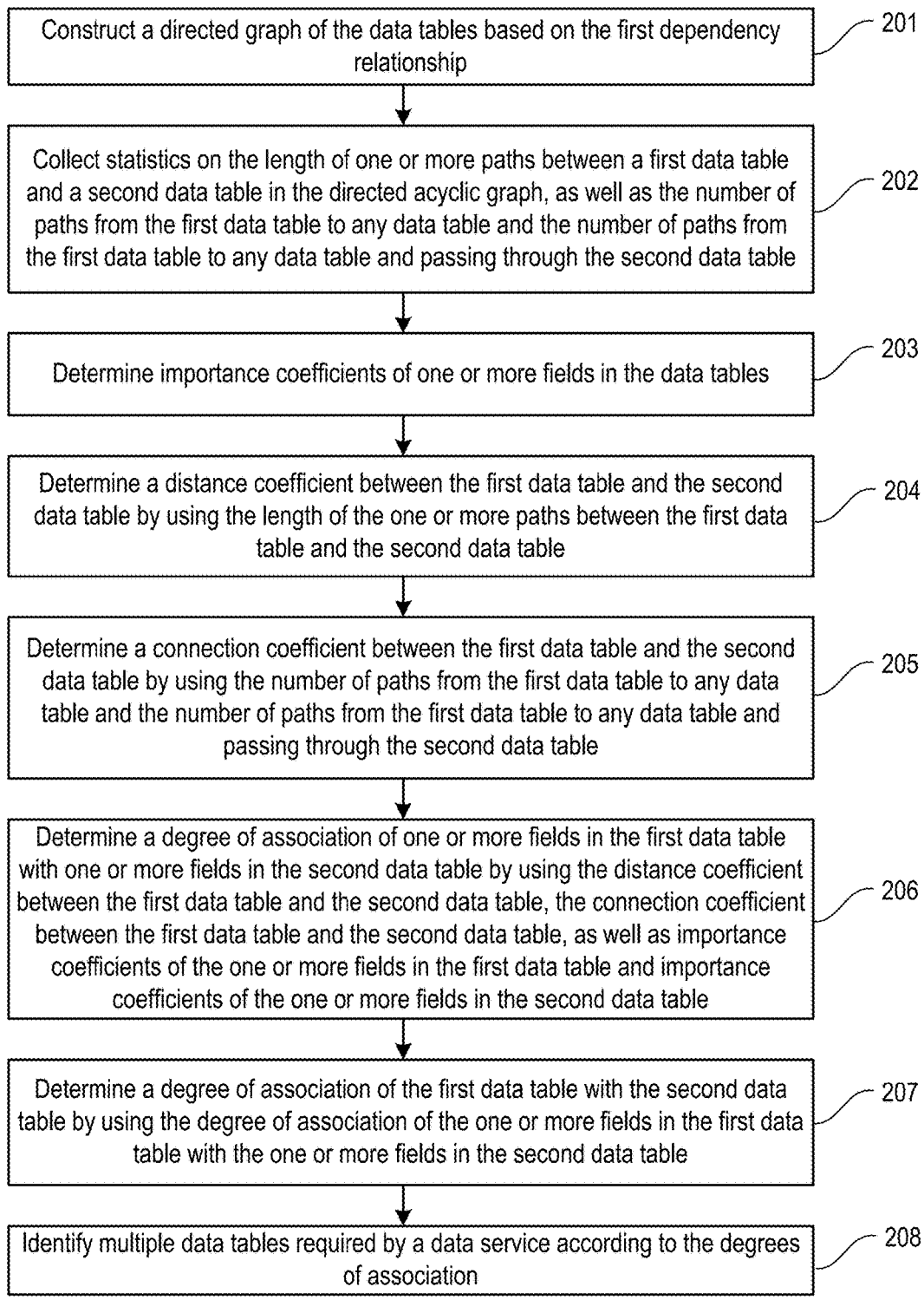
FIG. 4 is shown a flow diagram illustrating a method for identifying data tables according to some embodiments of the disclosure.

FIG. 4 is shown a flow diagram illustrating a method for identifying data tables according to some embodiments of the disclosure.

Step 201: construct a directed graph of the data tables based on the first dependency relationship.

In one embodiment, by acquiring mutual access data between all data tables in a data warehouse, a directed acyclic graph of the data tables can be constructed. In one embodiment of the disclosure, the step of constructing a directed graph of the data tables based on the first dependency relationship may specifically include the following substeps.

Substep 2011: construct a directed graph having data tables as nodes according to a sequence corresponding to the first dependency relationship.

Substep 2012: delete loops in the directed graph to obtain a directed acyclic graph of the data tables.

In one embodiment, after mutual access data (namely, a first dependency relationship between data tables) is obtained, first, a directed graph having the data tables as nodes may be constructed according to a sequence corresponding to the first dependency relationship, and then loops in the directed graph are deleted to obtain a directed acyclic graph of the data tables.

Figure 5:
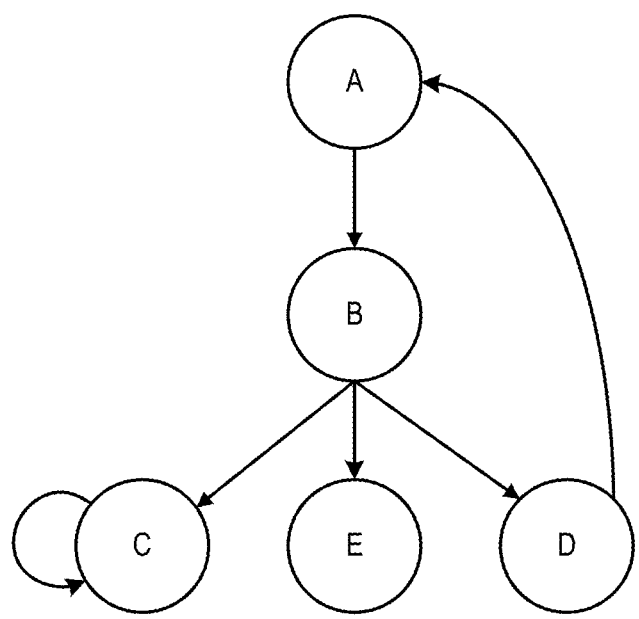
FIG. 5 is a schematic diagram of a directed graph having loops, according to some embodiments of the disclosure.

To illustrate the aforementioned steps, FIG. 5 presents a schematic diagram of a directed graph having loops, where a loop ABCC and a loop ABDA exist.

In one embodiment, loops in the directed graph may be removed by means of stacking. At each step of traversal starting from a first data table, when it is judged that a loop occurs, the loop can be deleted by deleting a directed line segment where the loop occurs. For example, starting from data table A, a loop occurs upon traversal to ABCC, then the loop can be deleted by deleting a directed line segment of data table C to itself. Upon traversal to ABDA, the loop can be deleted by deleting a directed line segment between data table D and the data table A.

Step 202: collect statistics on the length of one or more paths between a first data table and a second data table in the directed acyclic graph, as well as the number of paths from the first data table to any data table and the number of paths from the first data table to any data table and passing through the second data table.

In one embodiment, to determine a degree of association between the first data table and the second data table, statistics may be collected first in the directed acyclic graph on the length of one or more paths between the first data table and the second data table in the directed acyclic graph, as well as the number of paths from the first data table to any data table and the number of paths from the first data table to any data table and passing through the second data table.

Step 203: determine importance coefficients of one or more fields in the data tables.

In one embodiment, first, a use frequency of a certain field in a preset time period (usually one day) and a field level of the field may be acquired, and then an importance coefficient of the field is determined by using the equation $$\mathrm{weight}(a_i) = \alpha \cdot \mathrm{level\_weight}(a_i) + \beta \cdot \frac{\mathrm{use\_cnt}(a_i)}{\sum_{i=1}^{n} \mathrm{use\_cnt}(a_i)},$$

where level_weight($a_i$) is a field level of a field $a_i$, use_cnt($a_i$) is a use frequency of the field $a_i$ in a preset time period, n is the number of fields in the data table, a and are proportional coefficients, and $0<\alpha, \beta<1$.

Step 204: determine a distance coefficient between the first data table and the second data table by using the length of one or more paths between the first data table and the second data table.

Step 205: determine a connection coefficient between the first data table and the second data table by using the number of paths from the first data table to any data table and the number of paths from the first data table to any data table and passing through the second data table.

In one embodiment, after a path length and a path number of data tables are obtained, a distance coefficient and a connection coefficient between the data tables may be determined according to the path length and the path number respectively.

In one embodiment, the distance coefficient between the first data table and the second data table may be determined by using the equation $$\mathrm{length\_ratio}(A, B) = \frac{1}{\sum_{i=1}^{n} \mathrm{step}(A, B)},$$

where step(A, B) represents the length of one path from the first data table A to the second data table B, and n is the number of paths from the first data table A to the second data table B.

The connection coefficient between the first data table and the second data table may be determined by using the equation $$\text{conn\_ratio}(A, B) = \frac{\text{path\_cnt}(A, B, \text{leaf})}{\text{path\_cnt}(A, \text{null}, \text{leaf})},$$

where path_cnt(A, B, leaf) is the number of paths from the first data table A to any other data table that passes through the second data table B, and path_cnt(A, null, leaf) is the number of paths from the first data table A to any other data table. A larger connection coefficient indicates a higher connectivity between the data tables.

Step 206: determine a degree of association of one or more fields in the first data table with one or more fields in the second data table by using the distance coefficient between the first data table and the second data table, the connection coefficient between the first data table and the second data table, as well as importance coefficients of the one or more fields in the first data table and importance coefficients of the one or more fields in the second data table.

In one embodiment, after a distance coefficient and a connection coefficient between data tables as well as importance coefficients of one or more fields in the data tables are separately obtained, a degree of association between one or more fields in a first data table and one or more fields in a second data table having a dependency relationship may be determined by using the distance coefficient, the connection coefficient, and the importance coefficients.

In one embodiment, the degree of association of one or more fields in the first data table with one or more fields in the second data table may be determined by using the equation $$\text{weight}(A, a_i, B, b_j) = \frac{\text{conn\_ratio}(B, A) \cdot \rho + \text{length\_ratio}(B, A) \cdot \lambda}{\sum_{i=1}^{n} (\text{conn\_ratio}(B, i) \cdot \rho + \text{length\_ratio}(B, i) \cdot \lambda)} * \frac{\text{weight}(b_j)}{\sum_{m=1}^{n} \text{weight}(b_m)},$$

where i=1 . . . N represents a data table having a dependency relationship with the field $a_i$ in the first data table A, m=1 . . . n represents a field $b_m$ in the second data table B having a dependency relationship with the field $a_i$ in the first data table A, $\rho$ and $\lambda$ are proportional coefficients, and $0<\rho, \lambda<1$.

In one embodiment, weight(A, $a_i$, B, $b_j$) represents that the field $b_j$ in the data table B has a dependency relationship with the field $a_i$ in the data table A, as well as the degree of association between the field $a_i$ and the field $b_j$. The first part on the right side of the equation represents a comprehensive degree of association between the data table A and the data table B, and the comprehensive degree of association consists of two factors, which are respectively a connection coefficient and a degree of association coefficient; the second part on the right side of the equation represents a weight of the field $b_j$ in the data table B in all fields in the data table B having a blood relationship with the field $a_i$.

Step 207: determine a degree of association of the first data table with the second data table by using the degree of association of the one or more fields in the first data table with the one or more fields in the second data table.

In one embodiment, after the degree of association of one or more fields is obtained, the degree of association between data tables may be determined by using the degree of association between the fields.

In one embodiment, the degree of association of the first data table with the second data table may be determined by using the equation $$\text{attr}(A, B) = \frac{\sum_{m=1}^{M} \sum_{n=1}^{N} \text{weight}(A, a_m, B, b_n)}{M \cdot N},$$

where M is the number of fields in the first data table A having dependency relationships with fields in the second data table B, and N is the number of fields in the second data table B having dependency relationships with fields in the first data table A.

Step 208: identify multiple data tables required by a data service according to the degrees of association. In one embodiment, the step of identifying multiple data tables required by a data service according to the degrees of association may specifically include the following substeps.

Substep 2081: separately acquire degrees of association between data tables required by the data service.

Substep 2082: screen out multiple data tables of a preset number from the data tables required by the data service according to the degrees of association.

In one embodiment, after degrees of association between data tables are determined and obtained, the data tables may be identified based on the degrees of association. For example, L data tables may be used for a certain data service; then, after degrees of association between the L data tables are separately determined and obtained, top K data tables having high degrees of association in the L data tables may be further screened out, and then the top K data tables are given priority in operation and maintenance and guarantee, so as to ensure the data quality and output time of the data tables.

In one embodiment, a connection coefficient and a distance coefficient between data tables are put forward using graph theory to serve as two important weight factors in measuring a degree of association between data tables, and a hierarchical relationship between data tables is introduced, the hierarchical relationship between two tables is integrated into the distance coefficient to reasonably solve the problem of a degree of association between non-directly dependent data tables, and the problem that the degree of association between non-directly dependent data tables attenuates too rapidly with the change of the hierarchy is avoided.

Figure 6:
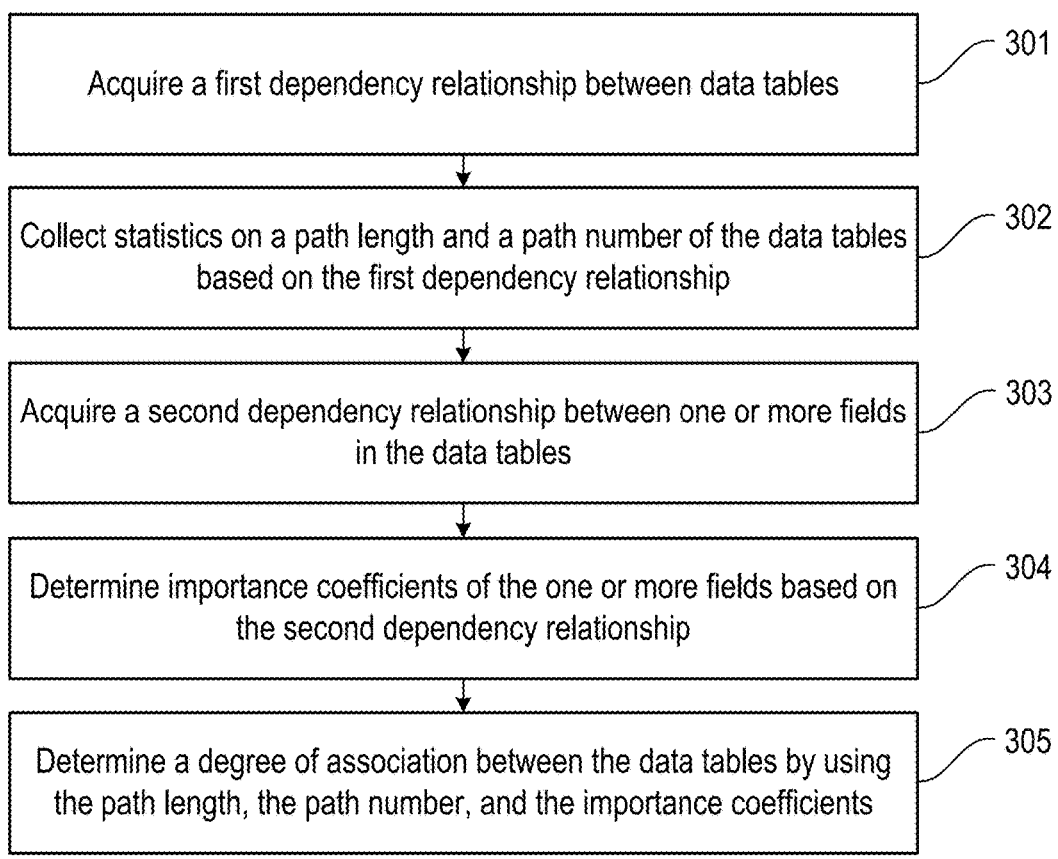
FIG. 6 is a flow diagram illustrating a method for determining a degree of association between data tables according to some embodiments of the disclosure.

FIG. 6 is a flow diagram illustrating a method for determining a degree of association between data tables, according to some embodiments of the disclosure.

Step 301: acquire a first dependency relationship between data tables.

Step 302: collect statistics on a path length and a path number of the data tables based on the first dependency relationship.

Step 303: acquire a second dependency relationship between one or more fields in the data tables.

Step 304: determine importance coefficients of the one or more fields based on the second dependency relationship.

Step 305: determine a degree of association between the data tables by using the path length, the path number, and the importance coefficients.

Since steps 301-305 are similar to steps 101-105 discussed in connection with FIG. 2, the description of which is incorporated herein by reference in its entirety. For ease of understanding, an example of determining a degree of association between data tables using the directed acyclic graph shown in FIG. 3 is used as an example is described below.

First dependency relationships between data tables may be represented as follows:

a)<A, C>
b)<B, C>
c)<C, E>
d)<D, E>
e)<A, C, E>
f)<B, C, E>

Second dependency relationships between fields may be represented as follows:

a)<C:c1, A:a1>
b)<C:c1, A:a2>
c)<C:c1, B:b1>
d)<C:c2, A:a3>
e)<C:c2, B:b2>
f)<C:c2, B:b3>
g)<E:e1, C:c1>
h)<E:e1, D:d2>
i)<E:e2, C:c2>

Field levels in the data tables may be represented as follows:

a)<A:a1, 1>
b)<A:a2, 1>
c)<A:a3, 3>
d)<B:b1, 2>
e)<B:b2, 2>
f)<B:b3, 3>
g)<C:c1, 1>
h)<C:c2, 3>
i)<D:d1, 2>
j)<D:d2, 3>
k)<E:e1, 1>
1)<E: e2, 2>

Data use frequencies of fields of the data tables and the number of downstream data tables may be represented as follows:

a)<A:a1, 2, 1>
b)<A:a2, 3, 1>
c)<A:a3, 1, 1>
d)<B:b1, 2, 1>
e)<B:b2, 1, 1>
f)<B:b3, 2, 1>
g)<C:c1, 1, 1>
h)<C:c2, 1, 1>
i)<D:d1, 2, 1>
j)<D:d2, 1, 1>
k)<E:e1, 0, 0>
l)<E:e2, 0, 0>

1. Determine a connection coefficient of the data table A and the data table E:

$$\text{conn\_ratio}(A, E) = \frac{1}{1} = 1$$

2. Determine a distance coefficient of the data table A and the data table E:

$$\text{length\_ratio}(A, E) = \frac{1}{2}$$

3. Determine a comprehensive degree of association between the data table A and the data table E (a proportional coefficient being 0.5):

$$\text{sum\_score}(A, E) = 0.5 \times 1 + 0.5 \times \frac{1}{2} = 0.75$$

4. It can be known from FIG. 3 that the field in data table A having a dependency relationship with field e2 in data table E is a3. In addition, data tables having dependency relationships with data table E include not only the data table A but also data tables C, B, and D. Therefore:

$$\text{weight}(A, a3, E, e2) =$$

$$\frac{\text{sum\_score}(A, E)}{\text{sum\_score}(A, C) + \text{sum\_score}(A, B) + \text{sum\_score}(A, D) + \text{sum\_score}(A, E)} \times \frac{\text{weight}(a3)}{\text{weight}(a3)} =$$

$$\frac{0.75}{1 + 0 + 0 + 0.75} \times 1 = \frac{3}{7} = 0.43$$

5. Since the data table A and the data table E have a dependency relationship only in the field a3 and the field e2, attr(A, E)=0.43, that is, the degree of association of data table A with data table E is 0.43.

Figure 7:
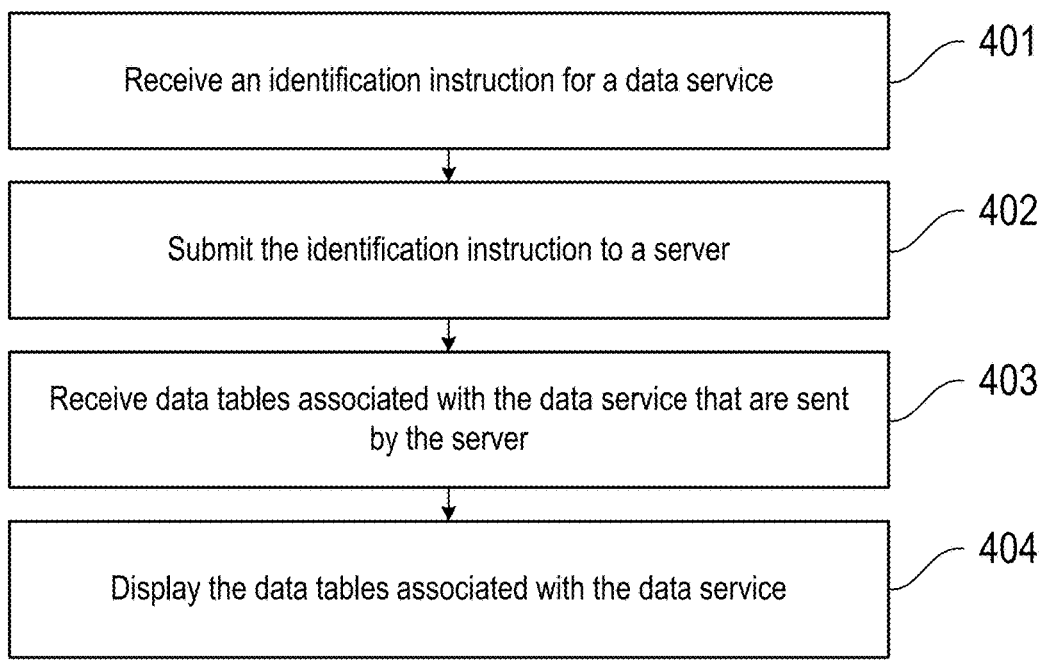
FIG. 7 is a flow diagram illustrating a method for identifying data tables according to some embodiments of the disclosure.

FIG. 7 is a flow diagram illustrating a method for identifying data tables according to some embodiments of the disclosure.

Step 401: receive an identification instruction for a data service.

Step 402: submit the identification instruction to a server.

Step 403: receive data tables associated with the data service that are sent by the server, where the data tables associated with the data service are obtained through the server by identifying the data tables associated with the data service based on the identification instruction.

Step 404: display the data tables associated with the data service.

In one embodiment, to identify data tables associated with a data service, an identification instruction for the data service may be sent to a terminal, after receiving the identification instruction, the terminal may submit the identification instruction to a server, the server identifies data tables associated with the data service and then feeds them back to the terminal, and after receiving the data tables associated with the data service that are fed back by the server, the terminal may display the data tables on a user interface of the terminal.

Figure 8:
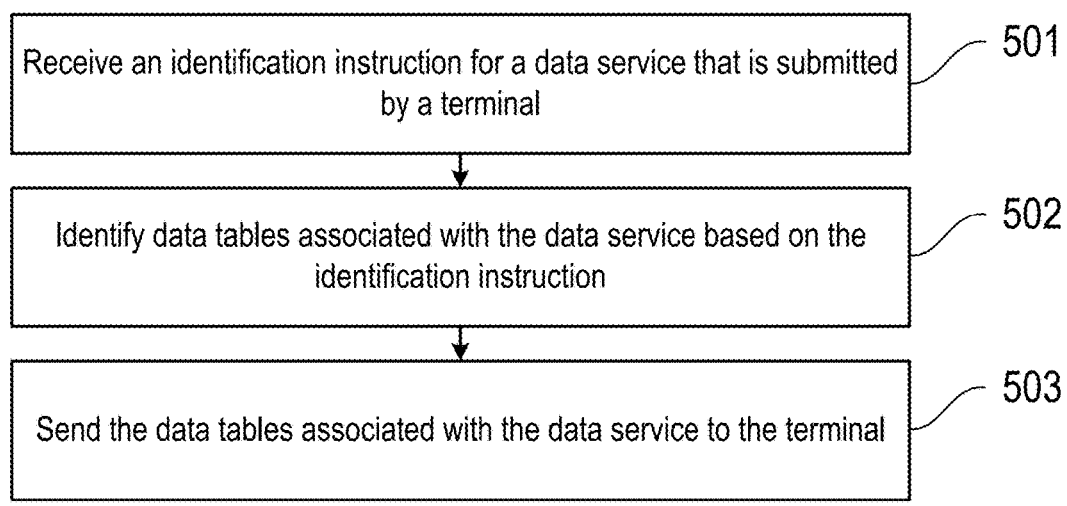
FIG. 8 is a flow diagram illustrating a method for identifying data tables according to some embodiments of the disclosure.

FIG. 8 is a flow diagram illustrating a method for identifying data tables according to some embodiments of the disclosure.

Step 501: receive an identification instruction for a data service that is submitted by a terminal.

Step 502: identify data tables associated with the data service based on the identification instruction.

Step 503: send the data tables associated with the data service to the terminal.

In one embodiment, after receiving an identification instruction for a certain data service that is submitted by a terminal, the server may identify data tables associated with the data service based on the identification instruction, and then feedback the data tables to the terminal.

In one embodiment, the step of identifying data tables associated with the data service based on the identification instruction may specifically include the following substeps.

Substep 5031: acquire a first dependency relationship between data tables.

Substep 5032: collect statistics on a path length and a path number of the data tables based on the first dependency relationship.

Substep 5033: acquire a second dependency relationship between one or more fields in the data tables.

Substep 5034: determine importance coefficients of the one or more fields based on the second dependency relationship.

Substep 5035: determine a degree of association between the data tables by using the path length, the path number, and the importance coefficients.

Substep 5036: Identify the data tables based on the degree of association.

Since substeps 5031-5036 are similar to steps 101-106 discussed in connection with FIG. 2, the description of which is incorporated herein by reference in its entirety.

It should be noted that, with regard to the method embodiments, all of them are expressed as a combination of a series of acts for simplicity of description, but those skilled in the art will recognize that the embodiments of the disclosure are not limited by the described order of acts, as some steps may, in accordance with the embodiments of the disclosure, be carried out in other orders or simultaneously. Secondly, those skilled in the art should also appreciate that the embodiments described in the specification all belong to the embodiments and that the involved acts are not necessarily required by the embodiments of the disclosure.

Figure 9:
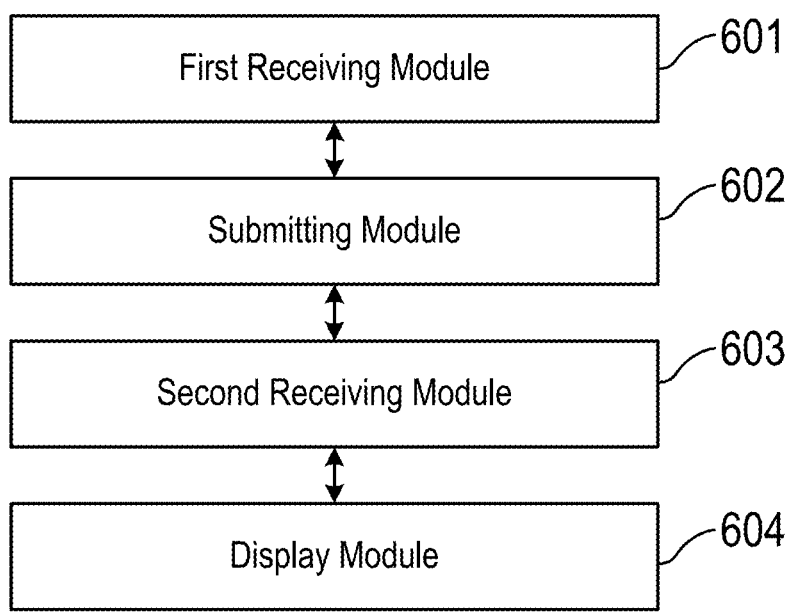
FIG. 9 is a block diagram of an apparatus for identifying data tables according to some embodiments of the disclosure.

FIG. 9 is a block diagram of an apparatus for identifying data tables according to some embodiments of the disclosure.

As illustrated, the apparatus includes a first receiving module 601 that receives an identification instruction for a data service; a submitting module 602 that submits the identification instruction to a server; a second receiving module 603 that receives data tables associated with the data service that are returned by the server, wherein the data tables associated with the data service may be obtained through the server by identifying the data tables associated with the data service included in the identification instruction; and a display module 604 that displays the data tables associated with the data service.

Figure 10:
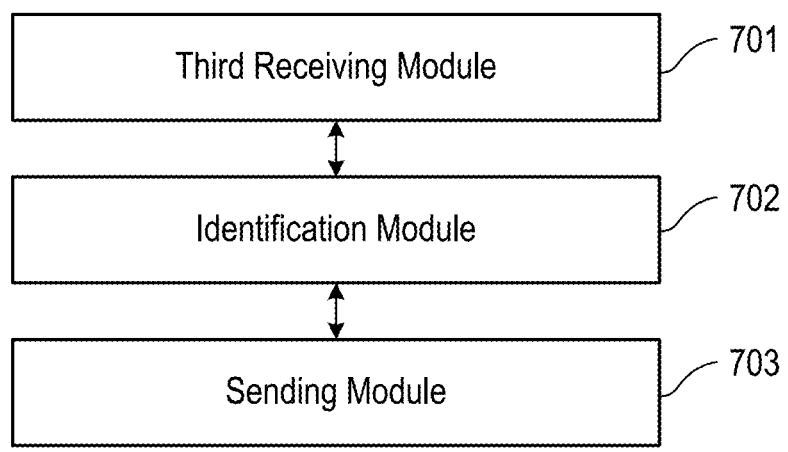
FIG. 10 is a block diagram of an apparatus for identifying data tables according to some embodiments of the disclosure.

FIG. 10 is a block diagram of an apparatus for identifying data tables according to some embodiments of the disclosure. As illustrated, the apparatus includes a third receiving module 701, identification module 702, and sending module 703.

In the illustrated embodiment, third receiving module 701 receives an identification instruction for a data service that is submitted by a terminal device, such as the device depicted in FIG. 9. Identification module 702 identifies data tables associated with the data service based on the identification instruction. Finally, sending module 703 sends the data tables associated with the data service to the terminal.

In some embodiments, identification module 702 includes a first dependency relationship acquisition submodule 7021, a path length and path number statistics collecting submodule 7022, a second dependency relationship acquisition submodule 7023, an importance coefficient determining submodule 7024, a degree of association determining submodule 7025, and a data table identification submodule 7026.

In one embodiment, first dependency relationship acquisition submodule 7021 acquires a first dependency relationship between data tables. In one embodiment, path length and path number statistics collecting submodule 7022 collects statistics on a path length and a path number of the data tables based on the first dependency relationship. In one embodiment, second dependency relationship acquisition submodule 7023 acquires a second dependency relationship between one or more fields in the data tables. In one embodiment, importance coefficient determining submodule 7024 determines importance coefficients of the one or more fields based on the second dependency relationship. In one embodiment, degree of association determining submodule 7025 determines a degree of association between the data tables by using the path length, the path number, and the importance coefficients. In one embodiment, data table identification submodule 7026 identifies the data tables based on the degree of association.

In some embodiments, the path length and path number statistics collecting submodule 7022 includes a directed acyclic graph construction unit and a path length and path number statistics collecting unit. In one embodiment, the directed acyclic graph construction unit constructs a directed acyclic graph of the data tables based on the first dependency relationship. In one embodiment, the path length and path number statistics collecting unit collects statistics on a path length and a path number in the directed acyclic graph.

In some embodiments, the directed acyclic graph construction unit includes an acyclic graph construction subunit and a directed acyclic graph obtaining subunit. In one embodiment, the acyclic graph construction subunit constructs a directed graph having the data tables as nodes according to a sequence corresponding to the first dependency relationship. In one embodiment, the directed acyclic graph obtaining subunit deletes loops in the directed graph to obtain the directed acyclic graph of the data tables.

In some embodiments, the path length and path number statistics collecting unit includes a path length statistics collecting subunit and a path number statistics collecting subunit. In one embodiment, the path length statistics collecting subunit collects statistics on the length of one or more paths between a first data table and a second data table in the directed acyclic graph. In one embodiment, the path number statistics collecting subunit collects statistics on the number of paths from the first data table to any data table and the number of paths from the first data table to any data table and passing through the second data table.

In some embodiments, the importance coefficient determining submodule 7024 includes a use frequency acquisition unit and an importance coefficient determining unit.

In one embodiment, the use frequency acquisition unit acquires use frequencies of the one or more fields in a preset time period, where the one or more fields may have corresponding field levels. In one embodiment, the importance coefficient determining unit determines importance coefficients of the one or more fields according to the use frequencies and/or the field levels, where the importance coefficients of the one or more fields are in positive correlation with the use frequencies and/or the field levels.

In one embodiment, the importance coefficients of the one or more fields may be determined by using the equation $$\text{weight}(a_i) = \alpha \cdot \text{level\_weight}(a_i) + \beta \cdot \frac{\text{use\_cnt}(a_i)}{\sum_{i=1}^{n} \text{use\_cnt}(a_i)},$$

where level_weight($a_i$) is a field level of a field $a_i$, use_cnt ($a_i$) is a use frequency of the field $a_i$, in a preset time period, and n is the number of fields in the data table.

In some embodiments, the degree of association determining submodule 7025 includes a distance coefficient determining unit, a connection coefficient determining unit, a field degree of association determining unit, and a degree of association between data tables determining unit.

In one embodiment, the distance coefficient determining unit determines a distance coefficient between a first data table and a second data table by using the length of one or more paths between the first data table and the second data table.

In one embodiment, the connection coefficient determining unit determines a connection coefficient between the first data table and the second data table by using the number of paths from the first data table to any data table and the number of paths from the first data table to any data table and passing through the second data table.

In one embodiment, the field degree of association determining unit determines a degree of association of one or more fields in the first data table with one or more fields in the second data table by using the distance coefficient between the first data table and the second data table, the connection coefficient between the first data table and the second data table, as well as importance coefficients of the one or more fields in the first data table and importance coefficients of the one or more fields in the second data table, where the one or more fields in the first data table have dependency relationships with the one or more fields in the second data table.

In one embodiment, the degree of association between data tables determining unit determines a degree of association of the first data table with the second data table by using the degree of association of the one or more fields in the first data table with the one or more fields in the second data table.

In one embodiment, the distance coefficient between the first data table and the second data table may be determined by using the equation $$\text{length\_ratio}(A, B) = \frac{1}{\sum_{i=1}^{n} \text{step}(A, B)},$$

where step(A, B) represents the length of one path from the first data table A to the second data table B, and n is the number of paths from the first data table A to the second data table B.

In one embodiment, the connection coefficient between the first data table and the second data table may be determined by using the equation $$\text{conn\_ratio}(A, B) = \frac{\text{path\_cnt}(A, B, \text{leaf})}{\text{path\_cnt}(A, \text{null}, \text{leaf})},$$

where path_cnt(A, B, leaf) is the number of paths from the first data table A to any data table and passing through the second data table B, and path_cnt(A, null, leaf) is the number of paths from the first data table A to any data table.

In one embodiment, the degree of association of one or more fields in the first data table with one or more fields in the second data table may be determined by using the equation $$\text{weight}(A, a_i, B, b_j) = \frac{\text{conn\_ratio}(B, A) \cdot \rho + \text{length\_ratio}(B, A) \cdot \lambda}{\sum_{i=1}^{n} (\text{conn\_ratio}(B, i) \cdot \rho + \text{length\_ratio}(B, i) \cdot \lambda)} * \frac{\text{weight}(b_j)}{\sum_{m=1}^{n} \text{weight}(b_m)},$$

where i=1 ... N represents a data table having a dependency relationship with the field $a_i$ in the first data table A, and m=1 ... n represents a field $b_m$ in the second data table B having a dependency relationship with the field $a_i$ in the first data table A.

In one embodiment, the degree of association of the first data table with the second data table may be determined by using the equation $$\text{attr}(A, B) = \frac{\sum_{m=1}^{M} \sum_{n=1}^{N} \text{weight}(A, a_m, B, b_n)}{M \cdot N},$$

where M is the number of fields in the first data table A having dependency relationships with fields in the second data table B, and N is the number of fields in the second data table B having dependency relationships with fields in the first data table A.

In some embodiments, the data table identification submodule 7026 includes a data table identification unit that identifies multiple data tables required by the data service according to the degrees of association.

In some embodiments, the data table identification unit includes a degree of association between data tables acquisition subunit, that separately acquires degrees of association between data tables required by the data service, and a data table screening subunit, that screens out multiple data tables of a preset number from the data tables required by the data service according to the degrees of association.

Figure 11:
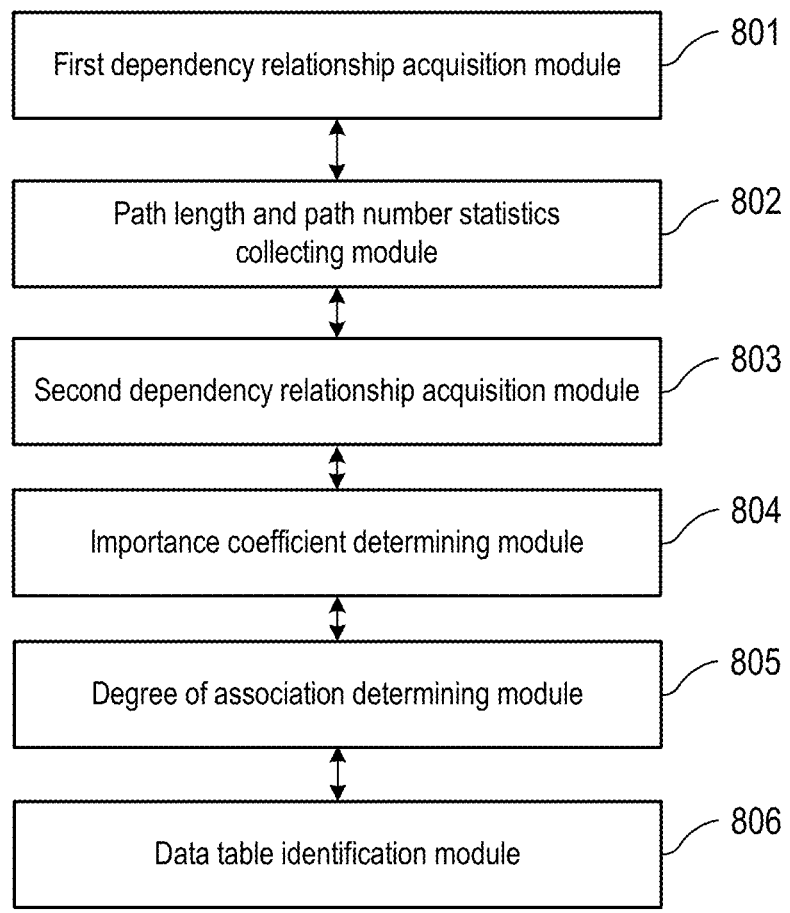
FIG. 11 is a block diagram of an apparatus for identifying data tables according to some embodiments of the disclosure.

FIG. 11 is a block diagram of an apparatus for identifying data tables according to some embodiments of the disclosure.

As illustrated, the apparatus includes a first dependency relationship acquisition module 801 that acquires a first dependency relationship between data tables.

As illustrated, the apparatus includes a path length and path number statistics collecting module 802 that to collects statistics on a path length and a path number of the data tables based on the first dependency relationship.

As illustrated, the apparatus includes a second dependency relationship acquisition module 803 that acquires a second dependency relationship between one or more fields in the data tables.

As illustrated, the apparatus includes an importance coefficient determining module 804 that determines importance coefficients of the one or more fields based on the second dependency relationship.

As illustrated, the apparatus includes a degree of association determining module 805 that determines a degree of association between the data tables by using the path length, the path number, and the importance coefficients.

As illustrated, the apparatus includes a data table identification module 806 that to identifies the data tables based on the degree of association.

Figure 12:
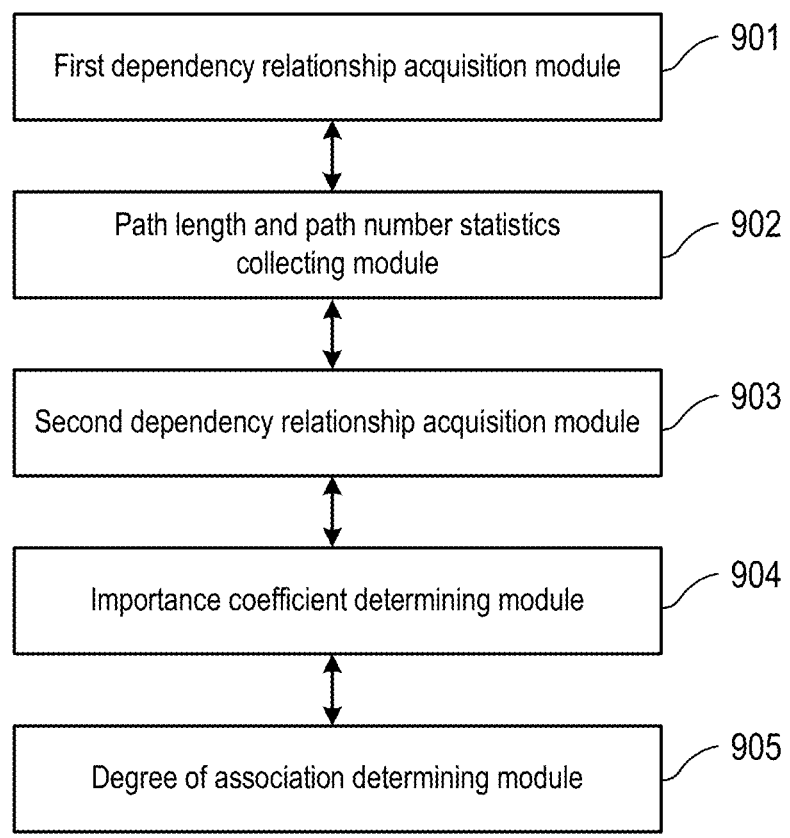
FIG. 12 is a block diagram of an apparatus for determining a degree of association between data tables according to some embodiments of the disclosure.

FIG. 12 is a block diagram of an apparatus for determining a degree of association between data tables according to some embodiments of the disclosure.

As illustrated, the apparatus includes a first dependency relationship acquisition module 901 that acquires a first dependency relationship between data tables.

As illustrated, the apparatus includes a path length and path number statistics collecting module 902 that collects statistics on a path length and a path number of the data tables based on the first dependency relationship.

As illustrated, the apparatus includes a second dependency relationship acquisition module 903 that acquires a second dependency relationship between one or more fields in the data tables.

As illustrated, the apparatus includes an importance coefficient determining module 904 that determines importance coefficients of the one or more fields based on the second dependency relationship.

As illustrated, the apparatus includes a degree of association determining module 905 that determines a degree of association between the data tables by using the path length, the path number, and the importance coefficients.

With regard to the apparatus embodiments, since the apparatus embodiments are substantially similar to the method embodiments, the description is relatively simple, and reference can be made to the description of the method embodiments for related parts.

Figure 13:
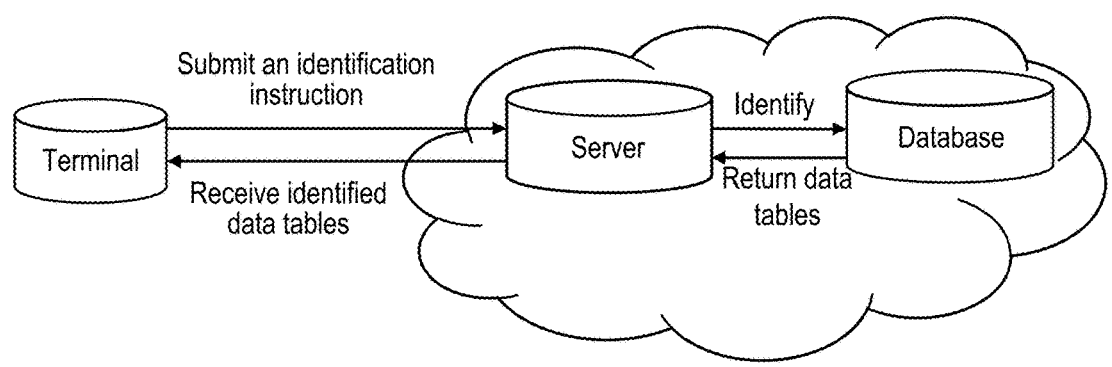
FIG. 13 is an architectural diagram of a system for identifying data tables according to some embodiments of the disclosure.

FIG. 13 is an architectural diagram of a system for identifying data tables according to some embodiments of the disclosure.

The system may include a terminal and a server. In some embodiments, the terminal receives an identification instruction for a data service; submits the identification instruction to the server; receives data tables from the server associated with the data service, wherein the data tables associated with the data service are obtained through the server by identifying the data tables associated with the data service based on the identification instruction; and displays the data tables associated with the data service.

In some embodiments, the server receives an identification instruction for a data service; identifies data tables associated with the data service based on the identification instruction; and outputs the data tables associated with the data service.

In one embodiment, identifying data tables associated with the data service based on the identification instruction may specifically include acquiring a first dependency relationship between data tables; collecting statistics on a path length and a path number of the data tables based on the first dependency relationship; acquiring a second dependency relationship between one or more fields in the data tables; determining importance coefficients of the one or more fields based on the second dependency relationship; determining a degree of association between the data tables by using the path length, the path number, and the importance coefficients; and identifying the data tables based on the degree of association.

Each embodiment in the disclosure is described in a progressive manner, with each embodiment focusing on parts different from other embodiments, and reference can be made to each other for identical and similar parts among various embodiments.

It should be understood by those skilled in the art that embodiments of the disclosure may be provided as a method, an apparatus, or a computer program product. Thus, embodiments of the disclosure may employ the form of a fully hardware embodiment, a fully software embodiment, or an embodiment combining software and hardware aspects. Moreover, embodiments of the disclosure may employ the form of a computer program product implemented on one or more computer usable storage media (including but not limited to a magnetic disk memory, CD-ROM, an optical memory, etc.) containing computer usable program code therein.

In a typical configuration, the computer device includes one or more processors (CPUs), input/output interfaces, network interfaces and memories. The memory may include computer readable medium in the form of non-permanent memory, random access memory (RAM) and/or non-volatile memory or the like, such as read-only memory (ROM) or flash memory (flash RAM). The memory is an example of a computer readable medium. The computer readable medium includes permanent and non-permanent, movable and non-movable media that can achieve information storage by means of any methods or techniques. The information may be computer readable instructions, data structures, modules of programs or other data. Examples of storage medium of computer include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disk (DVD) or other optical storages, magnetic cassette, magnetic tape, magnetic disk storage or other magnetic storage devices, or any other non-transmission medium that can be used for storing information accessible by a computing device. In light of the definitions herein, the computer readable medium does not include non-persistent computer readable media (transitory media), such as modulated data signals and carrier waves.

Embodiments of the disclosure are described with reference to a flow diagram and/or block diagram of a method, terminal device (system), and computer program product according to an embodiment of the disclosure. It should be understood that, each flow and/or block in the flow diagrams and/or block diagrams, and a combination of flows and/or blocks in the flow diagrams and/or block diagrams can be implemented by computer program instructions. These computer program instructions may be provided to a processor of a general purpose computer, a special purpose computer, an embedded processor, or another programmable data processing terminal device to produce a machine such that instructions executed by a processor of a computer or another programmable data processing terminal device produce means for implementing functions specified in one or more flows of the flow diagrams and/or one or more blocks of the block diagrams.

These computer program instructions may also be stored in a computer readable memory that can direct a computer or another programmable data processing terminal device to operate in a particular manner, such that the instructions stored in the computer readable memory produce an article of manufacture including instruction means, the instruction means implementing the functions specified in one or more flows of the flow diagrams and/or one or more blocks of the block diagrams.

These computer program instructions may also be loaded onto a computer or another programmable data processing terminal device such that a series of operational steps are performed on the computer or another programmable terminal device to produce a computer-implemented processing, and thus the instructions executed on the computer or another programmable terminal device provide the steps for implementing the functions specified in one or more flows of the flow diagrams and/or one or more blocks of the block diagrams.

Although embodiments of the embodiments of the disclosure have been described, those skilled in the art may make other alterations and modifications to these embodiments as soon as they become aware of the basic inventive concepts. Therefore, it is intended that the appended claims are interpreted as including embodiments and all changes and modifications falling within the scope of the embodiments of the disclosure.

Finally, it should also be noted that relational terms such as first and second are used herein only to distinguish one entity or operation from another entity or operation without necessarily requiring or implying that there are these actual relations or orders between the entities or operations. Furthermore, the terms "comprising," "including," or any other variation thereof are intended to encompass a non-exclusive inclusion so that a process, method, article, or terminal device that includes a series of elements includes not only those elements but also other elements not explicitly listed, or elements that are inherent to such a process, method, article, or terminal device. The element defined by the statement "comprising one . . . ", without further limitation, does not preclude the presence of additional identical elements in the process, method, article, or terminal device that includes the element.

Hereinbefore, a method for identifying data tables, a method for determining a degree of association between data tables, an apparatus for identifying data tables, an apparatus for determining a degree of association between data tables, and a system for identifying data tables provided by the disclosure are introduced in detail, the principles and implementation manners of the disclosure are set forth herein with reference to specific examples, descriptions of the above embodiments are merely served to assist in understanding the method and essential ideas of the disclosure; and to a person of ordinary skill in the art, changes may be made to specific implementation manners and application scopes according to the ideas of the disclosure, and in view of the above, the contents of the disclosure should not be construed as limiting the disclosure.

What is claimed is:

1. A method comprising:
   acquiring a first dependency relationship between a plurality of data tables;
   collecting statistics on a path length and a path number of the data tables based on the first dependency relationship;
   acquiring a second dependency relationship between one or more fields in the data tables;
   determining importance coefficients of the one or more fields based on the second dependency relationship;
   determining a distance coefficient between the data tables by using the path length of one or more paths between a first data table and a second data table;
   determine a connection coefficient between the data tables by using the path number from the first data table to any data table and the number of paths from the first data table to any data table and passing through the second data table;
   determining a degree of association between the data tables by using the distance coefficient, the connection coefficient, and the importance coefficients; and
   identifying the data tables based on the degree of association.

2. The method of claim 1 wherein a dependency relationship indicates that a first data table of the data tables depends on one or more of the data tables when a field of the first data table is generated based on a field of the one or more data tables.

3. The method of claim 1 wherein the path length represents the length of a distance between two data tables having a dependency relationship and the path number represents the number of direct and indirect paths between the two data tables.

4. The method of claim 1 wherein collecting statistics on a path length and a path number of the data tables based on the first dependency relationship comprises:
   constructing a directed acyclic graph of the data tables based on the first dependency relationship; and
   collecting statistics on a path length and a path number in the directed acyclic graph.

5. The method of claim 4 wherein the directed acyclic graph includes a set of nodes representing data tables and a set of edges connecting the set of nodes representing dependency relationships between data tables.

6. The method of claim 5 wherein constructing a directed acyclic graph of the data tables based on the first dependency relationship further comprises deleting one or more loops present within the directed acyclic graph.

7. The method of claim 1 wherein the second dependency relationship comprises the number of times a field of the one or more fields is used in a preset time period.

8. The method of claim 7 wherein determining importance coefficients of the one or more fields based on the second dependency relationship comprises:
   acquiring use frequencies of the one or more fields in the preset time period;
   acquiring field levels of the one or more fields; and
   determining importance coefficients of the one or more fields based on the use frequencies and the field levels.

9. The method of claim 1 wherein identifying the data tables based on the degree of association comprises:
   ranking the data tables based on the degree of association; and
   selecting a subset of the data tables required by a data service, wherein the subset of data tables includes the highest-ranking data tables.

10. An apparatus comprising:
    a processor; and
    a non-transitory memory storing computer-executable instructions therein that, when executed by the processor, cause the apparatus to perform the method of:
       acquiring a first dependency relationship between a plurality of data tables;
       collecting statistics on a path length and a path number of the data tables based on the first dependency relationship;
       acquiring a second dependency relationship between one or more fields in the data tables;
       determining importance coefficients of the one or more fields based on the second dependency relationship;
       determining a distance coefficient between the data tables by using the path length of one or more paths between a first data table and a second data table;
       determine a connection coefficient between the data tables by using the path number from the first data table to any data table and the number of paths from the first data table to any data table and passing through the second data table;

determining a degree of association between the data tables by using the distance coefficient, the connection coefficient, and the importance coefficients; and identifying the data tables based on the degree of association.

11. The apparatus of claim 10 wherein a dependency relationship indicates that a first data table of the data tables depends on one or more of the data tables when a field of the first data table is generated based on a field of the one or more data tables.

12. The apparatus of claim 10 wherein the path length represents the length of a distance between two data tables having a dependency relationship and the path number represents the number of direct and indirect paths between the two data tables.

13. The apparatus of claim 10 wherein collecting statistics on a path length and a path number of the data tables based on the first dependency relationship comprises:

constructing a directed acyclic graph of the data tables based on the first dependency relationship; and collecting statistics on a path length and a path number in the directed acyclic graph.

14. The apparatus of claim 13 wherein the directed acyclic graph includes a set of nodes representing data tables and a set of edges connecting the set of nodes representing dependency relationships between data tables.

15. The apparatus of claim 14 wherein constructing a directed acyclic graph of the data tables based on the first dependency relationship further comprises deleting one or more loops present within the directed acyclic graph.

16. The apparatus of claim 10 wherein the second dependency relationship comprises the number of times a field of the one or more fields is used in a preset time period.

17. The apparatus of claim 16 wherein determining importance coefficients of the one or more fields based on the second dependency relationship comprises:

acquiring use frequencies of the one or more fields in the preset time period;

acquiring field levels of the one or more fields; and determining importance coefficients of the one or more fields based on the use frequencies and the field levels.

18. The apparatus of claim 10 wherein identifying the data tables based on the degree of association comprises:

ranking the data tables based on the degree of association; and selecting a subset of the data tables required by a data service, wherein the subset of data tables includes the highest-ranking data tables.

* * * * *